United States Patent
Blaas

(10) Patent No.: US 10,685,067 B2
(45) Date of Patent: Jun. 16, 2020

(54) DATA VISUALIZATION SYSTEM

(71) Applicant: SynerScope B.V., Helvoirt (NL)

(72) Inventor: Jorik Blaas, Helvoirt (NL)

(73) Assignee: SYNERSCOPE B.V., Helvoirt (NL)

(*) Notice: Subject to any disclaimer, the term of this patent is extended or adjusted under 35 U.S.C. 154(b) by 415 days.

(21) Appl. No.: 15/790,772

(22) Filed: Oct. 23, 2017

(65) Prior Publication Data

US 2018/0046714 A1    Feb. 15, 2018

Related U.S. Application Data

(63) Continuation of application No. 14/215,238, filed on Mar. 17, 2014, now Pat. No. 9,798,808.

(51) Int. Cl.
| | |
|---|---|
| *G06F 16/951* | (2019.01) |
| *G06F 16/29* | (2019.01) |
| *G06F 16/901* | (2019.01) |
| *G06T 17/00* | (2006.01) |

(52) U.S. Cl.
CPC ............ *G06F 16/951* (2019.01); *G06F 16/29* (2019.01); *G06F 16/9027* (2019.01); *G06T 17/005* (2013.01)

(58) Field of Classification Search
None
See application file for complete search history.

(56) References Cited

U.S. PATENT DOCUMENTS

| | | | |
|---|---|---|---|
| 2005/0177303 A1 | 8/2005 | Han | |
| 2012/0066611 A1* | 3/2012 | Aravamudan | .... G06F 16/24578 715/747 |
| 2014/0236953 A1* | 8/2014 | Rapaport | .............. G06F 16/285 707/740 |
| 2014/0280318 A1* | 9/2014 | Simms | .................... G06F 16/29 707/769 |

FOREIGN PATENT DOCUMENTS

WO    2008134093 A1    11/2008

OTHER PUBLICATIONS

International Search Report and a Written Opinion issued in International Application No. PCT/EP2015/055301.
Blaas, J., 'Fast and reproducible fiber bundle selection in DTI visualization', Visualization 2005, Oct. 23-28, Minneapolis, MN, pp. 59-64.

* cited by examiner

*Primary Examiner* — Pierre M Vital
*Assistant Examiner* — Alicia M Antoine
(74) *Attorney, Agent, or Firm* — Kenealy Vaidya LLP

(57)    ABSTRACT

Some embodiments are directed to a method for determining, for a set of co-ordinate records associating co-ordinates with incident values, the numbers of incidents associated with co-ordinates within a query area. Co-ordinate data is stored as data representing a binary tree comprising leaf nodes, a root node and branch nodes wherein the leaf nodes are associated with individual items of co-ordinate data identified by the set of co-ordinate records, and the root node and branch nodes are each associated with a pair of child nodes, and are each associated with split values. In response to a query identifying a query area the binary tree is then recursively processed starting with the root node.

27 Claims, 7 Drawing Sheets

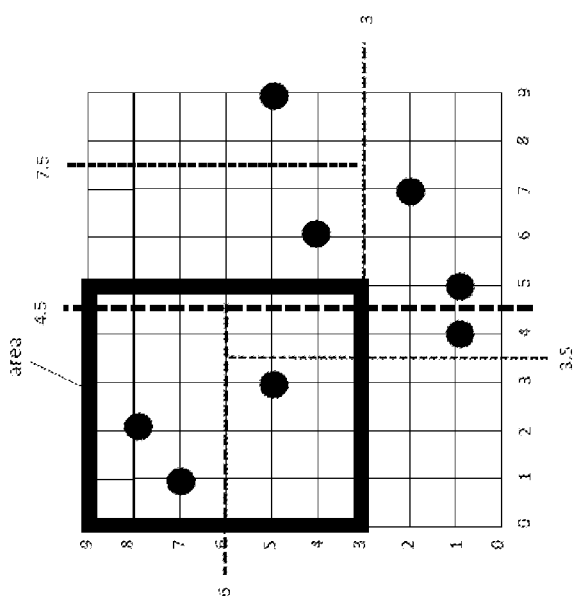

DATA VISUALIZATION SYSTEM

CROSS-REFERENCE TO RELATION APPLICATION(S)

This application is a continuation application of original application Ser. No. 14/215,238 filed on Mar. 17, 2014, and allowed on Jun. 16, 2017.

BACKGROUND

The present application concerns a data visualization system.

More specifically embodiments of the present application concern methods and apparatus for visualizing co-ordinate data in the form of intensity data. That is to say visualizing data associating co-ordinates with numbers of incidents or values occurring at or associated with those co-ordinates in the form of a visual display which identifies the numbers of incidents or values associated with individual areas.

Big data is the term used to describe massive volumes of both structured and unstructured data that are so large that they are difficult to process using traditional database and data processing techniques. However, big data is becoming increasingly important, as the volume of data available grows rapidly due to the near ubiquitous availability of the Internet and data-generating devices, such as mobile phones and tablet computers. In addition, with the rapid growth of big data has come the recognition that the analysis of larger data sets can lead to more accurate analysis.

A particular challenge when dealing with vast amounts of data involves the visualization of this data and the interrogation of such visualizations for analysis purposes. Generating visualizations of such vast amounts of data will typically require a significant amount of processing power, otherwise the time taken to generate a visualization will be too long to be of sufficient use. This is especially problematic when dynamic interrogation of a visualization is necessary in order for a worthwhile analysis to be performed. Consequently, the generation of visualizations of vast amounts of data is far from trivial, and increasing the efficiency with which a visualization is generated and the efficiency with which a visualization can be dynamically interrogated is highly desirable and technically challenging.

This is particularly true for data sets that contain an extremely large number of co-ordinate records, wherein each co-ordinate record identifies a point using a set of co-ordinates that is indicative of the location of an incident. The processing and analysis of such co-ordinate data can therefore be extremely useful for identifying trends and/or for identifying anomalies in the expected patterns of incidents, both of which can be indicative of an issue or can identify an area of significance.

SUMMARY

In accordance with one aspect of the present invention there is provided a method for determining, for a set of co-ordinate records associating co-ordinates with incident values, the numbers of incidents associated with co-ordinates within a query area. This can be achieved for a series of query areas and a visual representation of the co-ordinate records can be generated based on the results of the queries.

The present invention also provides computer systems for determining for a set of co-ordinate records the numbers of records associated with co-ordinates within a query area or for generating binary tree data for making such a determination. Further aspects of the present invention also relate to the provision of computer readable media storing computer implementable instructions which cause a programmable computer to process data.

To achieve efficient processing of data, co-ordinate data is stored as data representing a binary tree comprising leaf nodes, a root node and branch nodes wherein the leaf nodes are associated with individual items of co-ordinate data identified by the set of co-ordinate records, and the root node and branch nodes are each associated with a pair of child nodes, and are each associated with split values.

In response to a query identifying a query area the binary tree is then recursively processed starting with the root node.

If the node currently being processed corresponds to a leaf node, it is determined whether the item of co-ordinate data associated with the current node is within the query area and, if so, the number of incidents identified as being within the query area is incremented by a value corresponding to the number of incidents associated with those co-ordinates. Otherwise, the extent to which a bounding box associated with the node being processed intersects with the query area is determined. In the case of the root node, the bounding box is taken to be a bounding box identifying an area bounding all of the co-ordinates identified by the individual items of co-ordinate data. If the bounding box associated with the current node being processed is entirely contained entirely within the query area, the number of incidents identified as being within the query area is increased by a value corresponding to a determined number of incidents associated with the current node. If the bounding box associated with the current node partially intersects the query area, the child nodes of the current node are scheduled for processing and associated with bounding boxes based on the division of the bounding box of the current node divided into two parts on the basis of the split value associated with the current node. When all of the recursive processing has ended the accumulated total of the incidents is output as the number of records associated with co-ordinates within the query area.

The above described system is associated with a number of advantages. The primary advantages relate to the speed with which co-ordinate data can be converted into intensity data. Once a set of co-ordinate data has been processed to generate data representing a tree structure, for most query areas only a very limited portion of the tree structure needs to be queried and a limited subset of the items of co-ordinate data needs to be tested to determine whether or not they fall within the query area. If a query area is small, large areas can quickly be dismissed as not being of relevance as soon as it is determined that the bounding box associated with an area of the search space and a query area does not overlap. Conversely, if a query area is large, the system does not need to drill down beyond the stage where a bounding box is completely encompassed by a query area. If a bounding box is entirely contained within the query area the system merely updates the running total of incidents by the number of incidents associated with the node currently being processed or in the case of identifying a subset of incidents the number of incidents in the subset which are associated with that node. Either way this makes the system very efficient for processing large data sets.

In some embodiments co-ordinate data identifying individual items of co-ordinate data is stored in an indexed array. In such embodiments, the number of incidents associated with an area corresponding to the area of a bounding box associated with a node can be determined by determining the greatest and least index values of the items of co-ordinate data which correspond to the portion of the binary tree for which a current node being processed is a root node. The number of incidents can then be calculated based on the difference between the greatest and least identified index values.

In some embodiments only a sub-set of records may be of interest. In such embodiments it becomes necessary to be able to determine the numbers of records in the sub-set associated with co-ordinates within a query area. Such a method is similar to the method outlined above but rather than automatically incrementing a running total of incidents if co-ordinates associated with a leaf node are determined to fall within a query area, in such embodiments increments only occur if it is also determined that the record associated with the co-ordinates is within the subset. Similarly rather than updating the running total of incidents by a number corresponding to the total number of incidents associated with a node if the bounding box associated with a node lies entirely within a query area, a running total is incremented by a value identifying the number of incidents associated with a node which are within the selected sub-set.

The subset of the co-ordinate records may be identified based on user input. The items of co-ordinate data may be stored in an indexed array and a mask array may be stored identifying for each of the individual items of co-ordinate data whether or not the record associated with that item of co-ordinate data is within the selected sub-set of records. Such a mask array may be a binary array allocating for each item of co-ordinate data a Boolean value that specifies whether the co-ordinate record stored within that element has been selected as a record within the selected sub-set of records. Such a system may determine whether or not an item of co-ordinate data associated with a leaf node being processed is associated with data identifying that the record associated using the Boolean values in the mask array.

Additionally, in such a system, the mask array can be processed to generate a cumulative value array of values wherein the nth value in the array is the sum of the (n−1) Boolean values in the mask array. Determining a value corresponding to a determined number of incidents in the sub-set associated with a node currently can then be achieved by identifying co-ordinate records associated with leaf nodes for the portion of the binary tree for which the node being processed is a root node. The greatest and least index values for the identified co-ordinate records can then be used to determined number of incidents associated with the current node being processed as this will correspond to a value one greater than the difference between cumulative index values associated with these greatest and least index values.

In a further aspect there is provided computer systems and a computer implemented method for generating a binary tree for determining for a set of items of co-ordinate data the numbers of items of co-ordinate data associated with co-ordinates within a query area, wherein each of the items of co-ordinate data comprises a set of co-ordinate values each associated with a respective co-ordinate axis.

This can be achieved by storing the set items of co-ordinate data as an array; determining a set of split values, the split values being associated with the branch nodes of a binary tree; ordering the co-ordinate data within the array relative to the split values such that the array of co-ordinate records represents leaf nodes of the binary tree; and storing the set of split values and the ordered array of co-ordinate data.

A set of split values can be determined recursively starting with a group consisting of all of the set of items of co-ordinate data and continuing until each group contains a single item of co-ordinate data. The median co-ordinate value of the co-ordinates associated with a selected co-ordinate axis for items of co-ordinate data within a group can be determined and stored as a split value associated with a branch node of a binary tree. The group can then be divided into two groups: a group with co-ordinates values associated with the selected co-ordinate axis greater than the determined median co-ordinate value and a group with co-ordinates values associated with the selected co-ordinate axis less than the determined median co-ordinate value. These groups can then be scheduled for further processing where the groups are processed utilizing a different selected co-ordinate axis to the axis utilized to create the groups.

Ordering the co-ordinate data within the array relative to the split values may comprise starting with a group consisting of all of the items of co-ordinate data and continuing until each group contains a single item of co-ordinate data, recursively utilizing value of the co-ordinates associated with a selected co-ordinate axis to order the items of co-ordinate data in the group being processed; and dividing the group being processed on the basis of the co-ordinates associated with a selected co-ordinate axis into sub-groups as described above.

Storage of a linearized tree only requires the storage of a single dimensional linear array of calculated split values together with an ordered set of co-ordinate data. This can be supplemented by a linear binary mask and a cumulative index array so that numbers of incidents corresponding to a selected subset of records needs to be calculated. Data storage for implementing the above is therefore limited.

Further the processing in order to generate binary tree data as described above is also limited. Calculating the split value data and the ordered co-ordinate data involves recursively processing the co-ordinate data to determine a split value for a subset of the data. The calculation of a split value and the separation of a set of co-ordinates into two groups based on the split value is an N log N process making the process suitable for processing large volumes of data.

BRIEF DESCRIPTION OF THE DRAWINGS

Embodiments of the present invention will now be described in detail with reference to the accompanying drawings in which:

FIG. 7 is a schematic illustration a query area and set of co-ordinates associated with a number of incidents;

FIG. 8 is a schematic illustration of an index and a set of co-ordinate data stored as a binary array; and FIG. 9 is a schematic illustration of a set of co-ordinate data, an associated data mask and a cumulative index for determining the numbers of incidents associated with a particular area.

DETAILED DESCRIPTION

Figure 1:
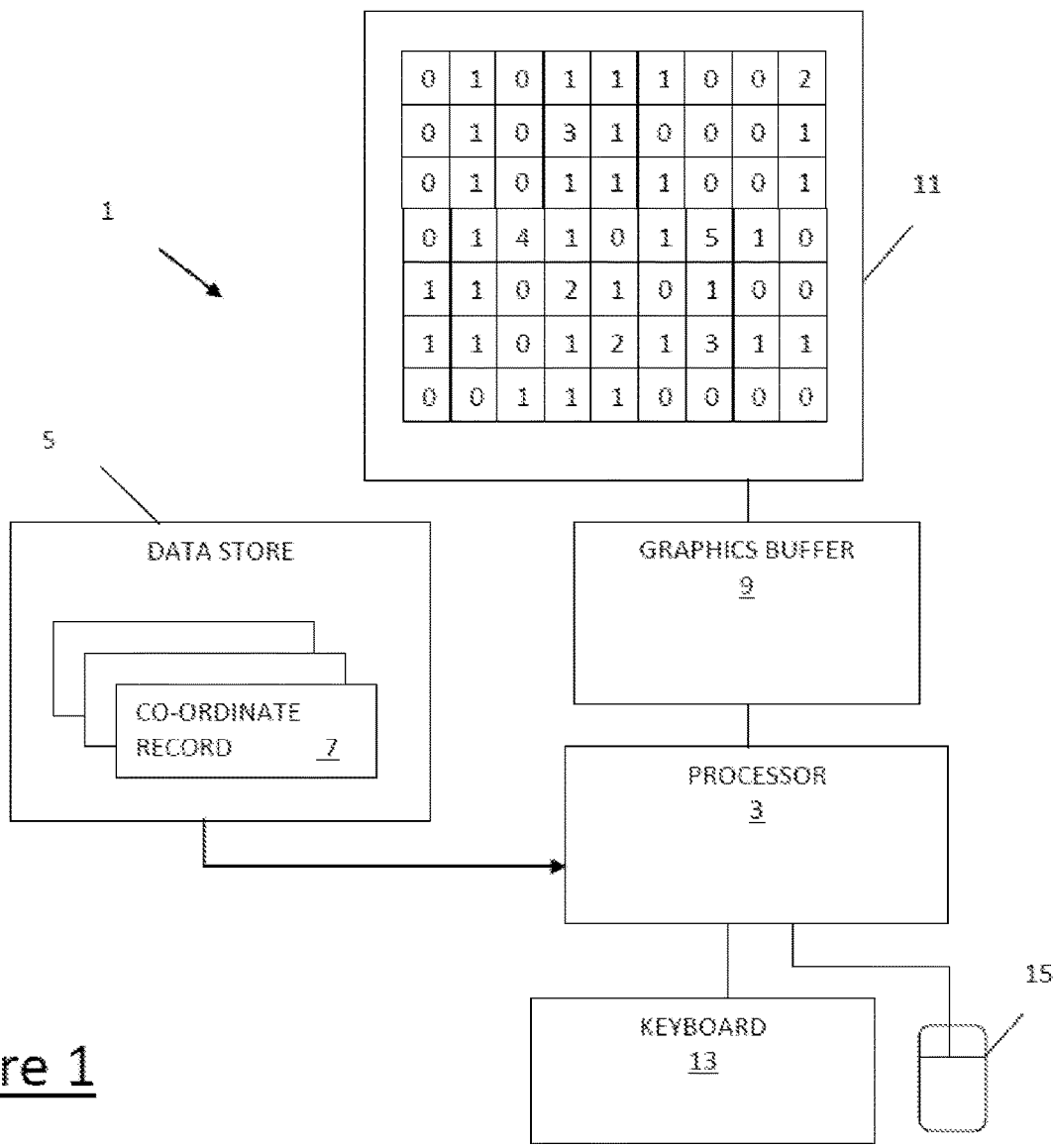
FIG. 1 is a schematic block diagram of a data visualization system accordance with an embodiment of the present invention.

FIG. 1 is a schematic block diagram of a data visualization system 1 in accordance with an embodiment of the present invention. In this embodiment the data visualization system 1 comprises a data store 5 arranged to store a set of co-ordinate records 7 each of which identifies a point using a pair of co-ordinates that is indicative of the location of an incident, and a processor 3 arranged to retrieve data from data store 5 and generate a graphic representation representing the densities of incidents based on the co-ordinate data of the points. This generated display data is then passed by the processor 3 to a graphics buffer 9 connected to the processor 3 and a display 11, and is then used by the display 11 to represent the data in the co-ordinate records being analyzed.

In addition the processor 3 is also responsive to user input via a keyboard 13 and a mouse 15 to enable a user to interact with the system 1 to select one or more subsets of points/co-ordinate records for further processing and/or analysis. For example, a user can interact with the system 1 to implement a selection of an area of the display 11 in order to identify a subset of the points/incidents represented in that area of the display that they wish to interrogate in more detail. By way of further example, a user can interact with the system 1 to specify one or more criteria for co-ordinate records that they wish to interrogate in more detail, and the system 1 will then identify those co-ordinate records that meet the specified criteria and update the display accordingly.

FIG. 1 illustrates an exemplary illustration of a data visualization generated by the system 1 on the display 11 in which the generated display data takes the form of an array of numbers where each of the individual cells/entries in the array identifies the number of incidents/co-ordinate records whose co-ordinate data falls/is located within an area that the individual cells of the array are intended to represent. As an alternative example, the generated display could be an array of cells where each individual cell in the array is assigned a color that represents the numbers of incidents with co-ordinate data within the area that each of the cells of the array are intended to represent (i.e. a heat map). In either the case, each of the cells in such an array could correspond to a group of one or more pixels of a display unit.

As will be explained in detail later, in this embodiment, in order to generate a visualization of a number of co-ordinate records that represents the co-ordinate records as an intensity/density map, the system processes the co-ordinate records 7 in the data store 5 to generate data representing an ordering of the co-ordinate records 7 and an associated set of split values which is stored as a linear array. This data represents the co-ordinate records as a linearized binary tree space-partitioning data structure.

In such a representation the root node can be thought of as representing the entire data space. The individual leaf nodes correspond to the individual co-ordinate points identified by the co-ordinate records. Every branch node (i.e. internal node) can be thought of as representing a splitting plane that divides the space into two-parts, referred to as subspaces. Each branch node therefore has a left and a right sub-tree (that corresponds to a subspace), with points to the left of the splitting plane being located on the left sub-tree of that node and points to the right of the splitting plane being located on the right sub-tree.

As will be explained this tree structure is constructed using a canonical method in which the splitting planes are axis-oriented, with their orientation cycling with each level of recursion. In other words, a first dimension is chosen for partitioning at the root level of the tree, with a second dimension being chosen for partitioning at the next level and so on, cycling through the dimensions. Consequently, for a two-dimensional tree, this would typically mean that at level 0 the tree splits on the x-axis, at level 1 on the y-axis, and at level 2 on the x-axis again.

In addition, when constructing the tree structure, each splitting location is chosen to be at the median of the points sorted along the splitting direction/axis in order to produce a generally balanced tree structure, in which each subspace contains approximately the same number of points. In some cases, the number of points cannot be evenly split (i.e. does not equal 2n), such that one of the points will lie on the median. In this case, the splitting location must then be chosen to be on one side or the other of the median value, such that there will be one more point on one side of the splitting plane than on the other. For example, when a point in a set that is to be split lies on the median value, the splitting location may then be chosen such that the point lying on the median value is located in the left sub-tree of the node representing the splitting plane. This could be achieved by implementing a floor operator/function. Alternatively, the splitting location may be chosen such that the point lying on the median value is located in the right sub-tree of the node representing the splitting plane. This could be achieved by implementing a ceiling operator/function. Consequently, when the number of points in the data set does not equal $2^n$, the leaf nodes containing a single point will be at different levels within the tree.

Each subdivision therefore splits the space into two sub-spaces which contain approximately an equal number of points (i.e. with approximately half the points in one sub-space and approximately half in the other), and the recursive splitting of the space stops when the number of points in each sub-space is equal to one.

When a binary tree is stored in a memory, each of the branch nodes of the binary tree are associated with a split value (i.e. defining the position on the splitting axis that separates two subspaces) and pointers to its two children, and for a full tree with n leaves n−1 split values are required. However, in the embodiments described herein, the binary tree used to structure the co-ordinate data is stored in a linearized form, wherein the co-ordinate data is stored on its own within an array, with the split values stored in a separate further array, with the order of the co-ordinate data within the array and the split values in the further array defining the structure of the binary tree.

An illustrative example of the processing to generate a linearized tree representation of the data will now be described with reference to FIGS. 2A-D, 3, 4 and 5.

Figures 3, 4:
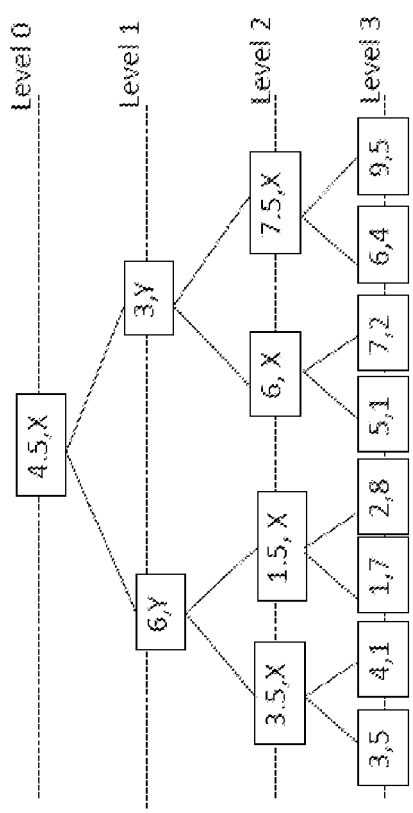
FIG. 3 illustrates an example of a binary tree structure where nodes in the binary tree are associated with split values and leaves are associated with co-ordinate data used to generate the binary tree.
FIG. 4 illustrates the storage of the binary tree of FIG. 3 in the form of a pair of linear arrays.
Figure 5:
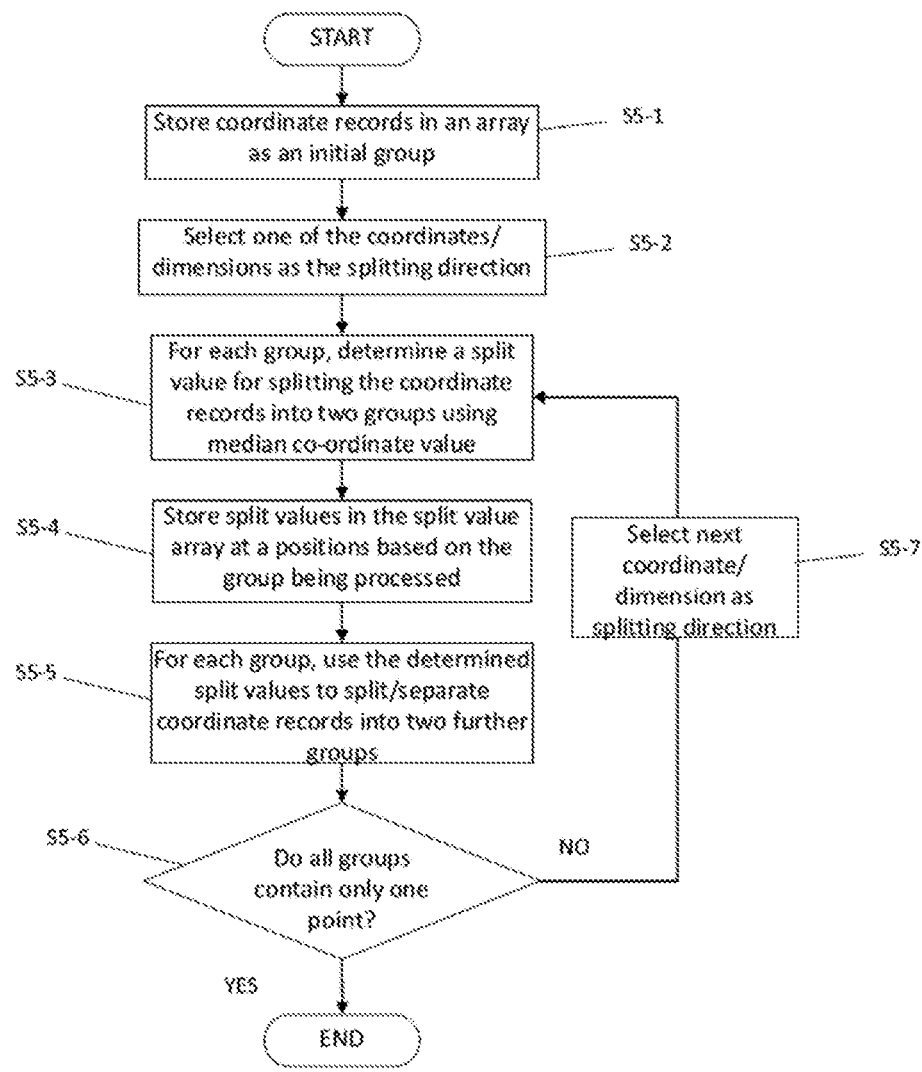
FIG. 5 is a flow diagram of the processing undertaken to generate a set of split values for converting co-ordinate data into intensity data.

In the following example FIGS. 2A-D are illustrations for explaining the processing involved in generating a tree for an exemplary set of points; FIG. 3 is a schematic illustration of the tree; FIG. 4 is schematic illustration of data stored in memory representing the tree and FIG. 5 is a flow diagram of the processing for generating the tree.

Figure 2B:
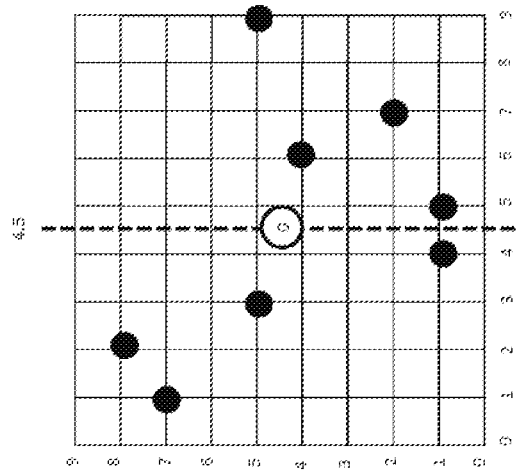
FIGS. 2A-D are schematic illustrations of the processing of an exemplary set of co-ordinate data to determine a set of split values.
Figure 2A:
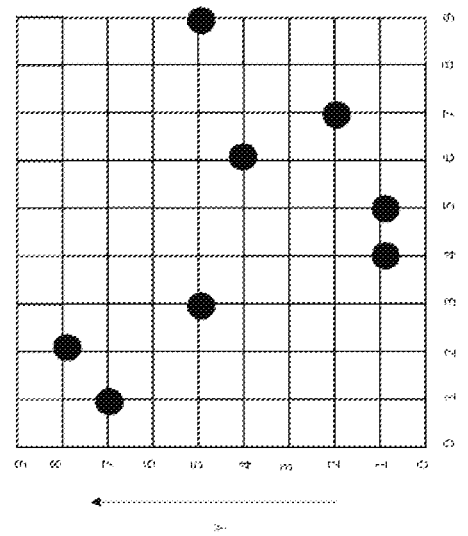

FIG. 2A illustrates a space representation of eight points/co-ordinate records, each defined by a pair of co-ordinates (i.e. a tuple), for which the co-ordinate data represented in an array is:

TABLE 1

| X-co-ordinate | 5 | 2 | 1 | 3 | 6 | 4 | 7 | 9 |
|---|---|---|---|---|---|---|---|---|
| Y-co-ordinate | 1 | 8 | 7 | 5 | 4 | 1 | 2 | 5 |

In a first split of the recursive splitting process, the splitting direction in this example is chosen to be along the x-axis. The median value that is to be used to split the space along the x-axis is then calculated. In this example, as there are an even number of points in the space, this median value is the mean x co-ordinate of two of the points (i.e. (4,1) and (5,1)), such that the split value for this level of the tree is 4.5. The data within the array is therefore sorted so that the points/co-ordinate records are effectively split into sections that correspond to the two subspaces defined by the split value. In this example, the points/co-ordinate records that lie to the left of the splitting plane are grouped in the left-hand side of the array (i.e. the left-hand sub-tree), whilst the points/co-ordinate records that lie to the right of the splitting plane are grouped in the right-hand side of the array (i.e. the right-hand sub-tree), such that the array of co-ordinate data becomes:

TABLE 2

| X-co-ordinate | 1 | 2 | 3 | 4 | 5 | 6 | 7 | 9 |
|---|---|---|---|---|---|---|---|---|
| Y-co-ordinate | 7 | 8 | 5 | 1 | 1 | 4 | 2 | 5 |

Additionally, this first item of split value data: 4.5 is stored. In this embodiment this split value data is stored in a linear array which is one entry smaller than the number of items of co-ordinate data being processed. So in the above example where eight co-ordinate records are being processed, the split value would be stored as an entry in a seven entry linear array such as illustrated below:

TABLE 3

| Split value array | 4.5 |
|---|---|

FIG. 2B illustrates the space representation of the eight points/co-ordinate records in which the space has been split into two subspaces by a splitting plane at x=4.5, such that each subspace includes half of the points (i.e. 4) that were present in the space that has been split. The splitting plane is labeled with its depth within the tree (i.e. 0).

In a second split of the recursive splitting process, the splitting direction cycles to the next dimension, such that the splitting direction is along the y-axis. The median values that are to be used to split each subspace along the y-axis are then calculated. In this example, the median value of the left-hand section of the array (corresponding to the left-hand side subspace/left-hand sub-tree) is the mean y co-ordinate of two of the points (i.e. (3,5) and (1,7)), such that the split value for this sub-tree is 6. The median value of the right-hand section of the array (corresponding to the right-hand side subspace/right-hand sub-tree) is the mean y co-ordinate of two of the points (i.e. (6,4) and (7,3)), such that the split value for this sub-tree is 3. The data within the array is therefore sorted so that the points/co-ordinate records in each section of the array are effectively split again into further sections that correspond to the four subspaces defined by the two split values. The array of co-ordinate data therefore becomes:

TABLE 4

| X-co-ordinate | 4 | 3 | 1 | 2 | 5 | 7 | 6 | 9 |
|---|---|---|---|---|---|---|---|---|
| Y-co-ordinate | 1 | 5 | 7 | 8 | 1 | 2 | 4 | 5 |

And again the two new items of split value data are also stored.

TABLE 5

| Split value array | 6 | 4.5 | 3 |
|---|---|---|---|

Figure 2D:
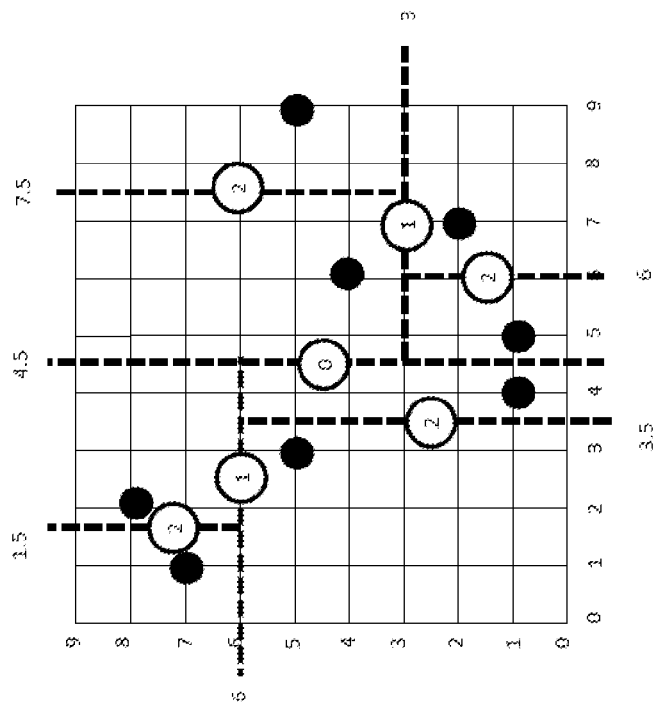
Figure 2C:
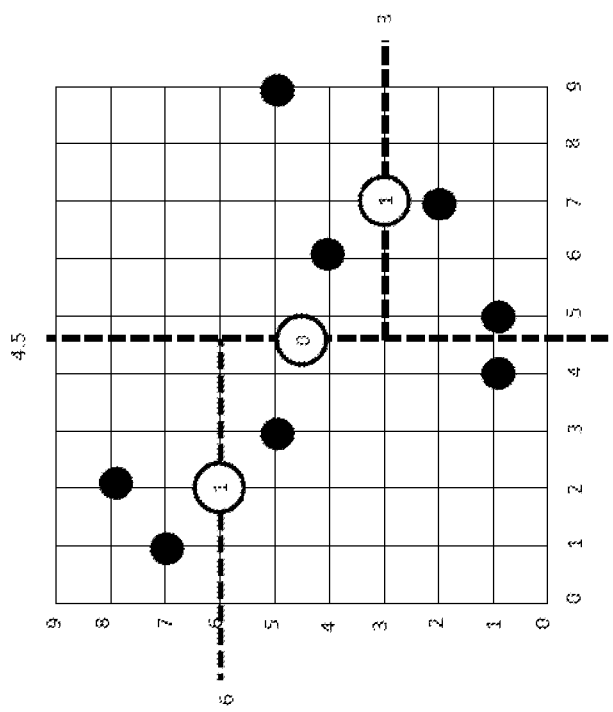

FIG. 2C illustrates the space representation of eight points/co-ordinate records in which the two subspaces of FIG. 2B have each been split into two further subspaces, such that there are now four subspaces. The left-hand subspace has been split by a splitting plane at y=6, whilst the right-hand subspace has been split by a splitting plane at y=3. Each of the four subspaces now include two of the points defined by the co-ordinate data.

In a third split of the recursive splitting process, the splitting direction again cycles to the next dimension, such that the splitting direction is along the x-axis. The median values that are to be used to split each subspace along the x-axis are then calculated. In this example, the median value of the left-most section of the array (corresponding to the bottom left subspace) is the average x co-ordinate of two of the points (i.e. (4,1) and (3,5)), such that the split value for this sub-tree is 3.5. The median value of the second-left section of the array (corresponding to the top left subspace) is the average x co-ordinate of two of the points (i.e. (1,7) and (2,8)), such that the split value for this sub-tree is 1.5. The median value of the second-right section of the array (corresponding to the bottom right subspace) is the average x co-ordinate of two of the points (i.e. (5,1) and (7,2)), such that the split value for this sub-tree is 6. The median value of the right-most section of the array (corresponding to the top right subspace) is the average x co-ordinate of two of the points (i.e. (6,4) and (9,5)), such that the split value for this sub-tree is 7.5. The data within the array is again sorted so that the points/co-ordinate records in each section of the array are effectively split again into further sections that correspond to the eight subspaces defined by the four split values. The array of co-ordinate data therefore becomes:

TABLE 6

| X-co-ordinate | 3 | 4 | 1 | 2 | 5 | 7 | 6 | 9 |
|---|---|---|---|---|---|---|---|---|
| Y-co-ordinate | 5 | 1 | 7 | 8 | 1 | 2 | 4 | 5 |

With the split value array being updated to accommodate the new items of split value data as below:

TABLE 7

| Split value array | 3.5 | 6 | 1.5 | 4.5 | 6 | 3 | 7.5 |
|---|---|---|---|---|---|---|---|

Which together corresponds to the data as illustrated in FIG. 4.

FIG. 2D illustrates the space representation of the eight points/co-ordinate records in which the four subspaces of FIG. 2C have each been split into two further subspaces, such that there are now eight subspaces. The bottom left subspace has been split by a splitting plane at x=3.5, the top left subspace has been split by a splitting plane at x=1.5, the bottom right subspace has been split by a splitting plane at x=6, and the top right subspace has been split by a splitting plane at x=7.5. Each of the eight subspaces now includes only a single one of the points defined by the co-ordinate data, and the splitting is therefore complete. FIG. 2D therefore illustrates the space representation of a two-dimensional tree of depth 3 containing eight points.

FIG. 3 illustrates an example representation of the binary tree resulting from the processing of the co-ordinate data given above. In the representation of FIG. 3, the leaf nodes include the co-ordinate data of the points, whilst each branch/internal node defines the splitting axis of the chosen splitting plane and split value/location along that axis. In practice, the root node of the tree corresponds to all of the points in the set, each branch node then corresponds a subset of the points (i.e. the points contained within a subspace defined by one or more splitting planes), and each leaf node contains a single point.

It should be noted that, FIG. 4 illustrates schematically an example of a linearized two dimensional tree structure which comprises an ordered array of co-ordinate records and a corresponding ordered array of the split vales determined for the tree. This linearized structure saves a considerable amount of memory as the structure of the tree is stored implicitly rather than explicitly.

FIG. 5 is a flow diagram of the processing implemented by the processor 3 to generate a linearized tree from an array of co-ordinate data that comprises co-ordinate records each of which defines a point by a set of co-ordinates. This generation of the linearized tree structure occurs 'in-place'. In other words, the process takes the array of co-ordinate data and generates a linearized tree by implementing a number of grouping steps within the array that results in an appropriately ordered array of co-ordinate data, wherein each grouping step effectively creates another level of the tree.

Firstly, the co-ordinate data set is stored in the array and the entire data set is defined as an initial group of co-ordinate records (S5-1). A recursive splitting process is then implemented in which the co-ordinate records are recursively sorted into further sub-groups that each correspond to node of the tree (i.e. the points within a subspace that is defined by a split value), wherein the splitting direction is cycled at each level of recursion. In this regard, the grouping of the co-ordinates implements the creation of a new node in the tree.

To initiate the recursive splitting process, one of the axes/dimensions is selected as the first splitting direction (S5-2). For example, the x-direction may be selected as the first splitting direction. Then, for each set of co-ordinate records, a split value for splitting the co-ordinate records in the set along the splitting direction is determined (S5-3). The split value in this embodiment is determined as the median value of the points being split with respect to their co-ordinates in the splitting axis being used for the splitting plane (i.e. the median of the splitting direction co-ordinate for the co-ordinate records/points in the group). The determined split value is then stored in a corresponding position within the split value array (S5-4).

Once the split value has been determined for a group of points that corresponds to a node of the tree, the co-ordinate records/points within the group are split/separated into two further sub-groups using the split value (S5-5). This splitting of a group into two further groups involves ordering the co-ordinate records within the corresponding section of the array such that those co-ordinate records whose splitting direction co-ordinate is less than the split value are located on the left-hand side of that section of the array, whilst those co-ordinate records whose splitting direction co-ordinate is greater than the split value are located on the right-hand side of that section of the array. This ordering of the co-ordinate records within the sections of the array that correspond to a node of the tree is illustrated above.

After each group has been split, it is then determined whether the number of co-ordinate records/points in each current group is equal to one (S5-6).

When the number of co-ordinate records/points in each current group is not yet equal to one, the next axis/dimension in the co-ordinate set is selected as the next splitting direction and the process returns to step S5-3 in order to continue further splitting each group (S5-7). By way of example, if the first split involved splitting the co-ordinate records along the x-direction, then the second split would involve splitting the co-ordinate records along the y-direction, and so on.

When the number of co-ordinate records/points in each current group is equal to one, the recursive splitting is complete and the process ends.

Having processed and stored the linear arrays representing the generated split data and the ordered list of co-ordinate data, this data can then be used to determine the numbers of incidents in an arbitrary area in a highly efficient and rapid manner as will now be described with reference to FIGS. 6-7.

To determine the number of incidents that lie within a particular area, the processor 3 utilizes the stored data in a manner which effectively recursively traverses the branches of the implicit tree structure recorded by the data from the root node to determine which areas associated with the nodes of the tree are contained within the query area. The traversal of each branch of the tree continues until either a leaf node is reached or until it is determined that a bounding box containing all of the points corresponding to a node does not intersect the area defined by the query.

For each branch node traversed (including the root node), a bounding box associated with the node is compared with the query area to determine the extent to which the bounding box associated with the node intersects with the area defined by the query.

Thus in this way the processing is made to be highly efficient since the implicit tree structure is limited to processing the higher levels of the tree whenever it can be determined that a node lies either wholly in or wholly outside of the query area in question. Thus in the case of very large or very small query areas processing ends rapidly.

The bounding box associated with the root node is defined as being a bounding box which encompasses all of the items of co-ordinate data. For subsequent nodes, bounding boxes are calculated on the fly by using the split values associated with a parent node to split the bounding box associated with the parent node into two halves. Thus at each level within the tree the size of the bounding boxes gets progressively smaller, increasing the likelihood that a bounding box will be found to be either entirely within or entirely outside of the query area.

In order to determine if the bounding box intersects with the query area, all four corners of the bounding box are compared with the query area. If all corners of the bounding box are inside the area then the entire bounding box, and therefore all of the points within the corresponding node, is contained within the area. This will be the case if the bounding box is smaller than the area and located within the area, but also if the area matches the bounding box. If none of the corners of the bounding box are inside the area then the bounding box does not intersect with the area. If some but not all of the corners of the bounding box are inside the area then the bounding box partially intersects with the area.

If the bounding box for the node partially intersects with the area, both child nodes of the node are traversed (i.e. further traversal of the branches extending from the node is required). If it is determined that the bounding box for a branch node is entirely contained with the area, it is determined that all of the points within that bounding box (i.e. that correspond to the node being traversed) are within the original query area. Conversely if the bounding box associated with a node does not intersect with the area, then it is determined that none of the points within that bounding box that correspond to the node being traversed are within the area, and no further traversal of the branch below that node is required.

Finally, if a leaf node in the tree is reached, this will be associated with co-ordinates identifying a single incident. In the case of a leaf node, whether or not that particular incident is within the query area is determined by simply determining if the point corresponding to that the leaf node is contained within the query area.

The total number of incidents within a query area can be determined by keeping a running total of incidents and updating the total whenever a bounding box is wholly contained within the query area or a leaf node is processed and found to be associated with co-ordinate data lying within the query area.

Figure 6:
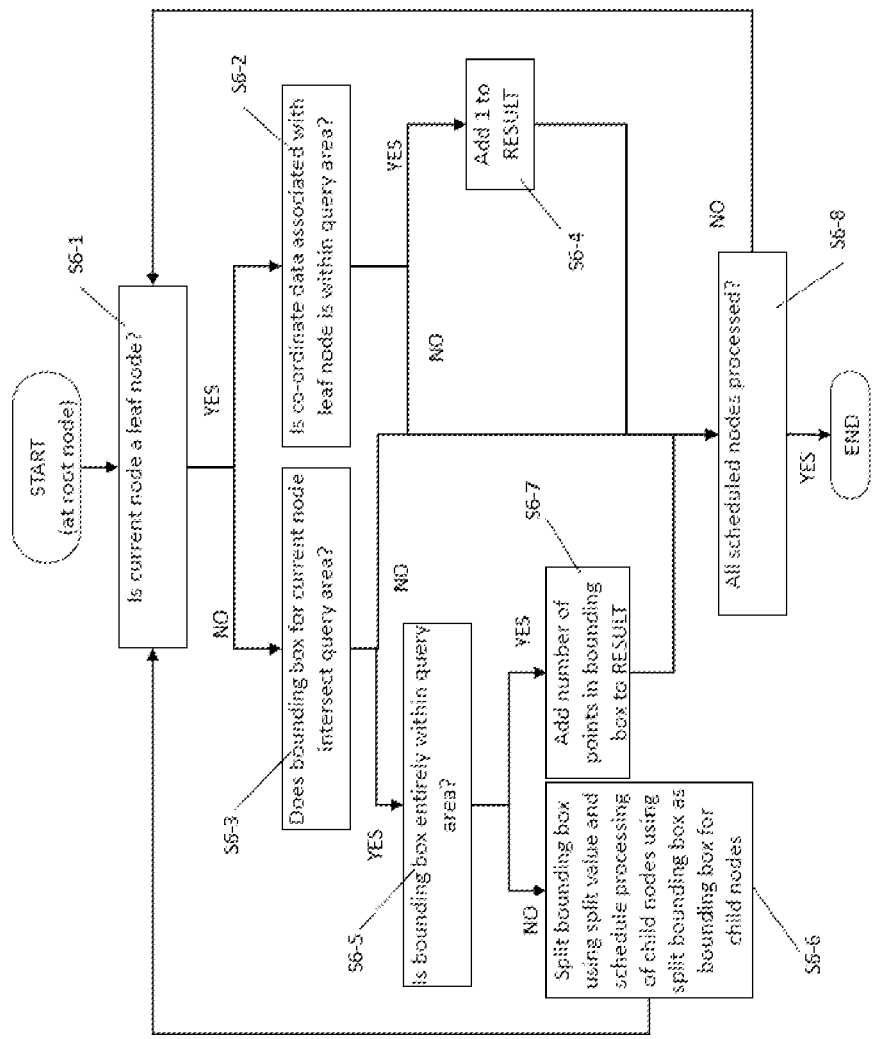
FIG. 6 is a flow diagram of the processing undertaken to determine the number of incidents associated with co-ordinate data within an identified area.

FIG. 6 is a flow diagram of an algorithm for the processing implemented by the processor 3 to calculate the number of points that are within one of a plurality of areas that are to be displayed as part of the image in the manner described above. The recursive traversal of the tree starts at the root node, and therefore starts at a bounding box that encloses all of the points.

Initially, it is determined if the node currently being considered corresponds to a leaf node (S6-1).

If the node currently being considered corresponds to a leaf node, it is then determined if the point defined by the co-ordinate data associated with the leaf node lies within the query area (S6-2). That is to say the co-ordinate data associated with the leaf node being considered is compared with the co-ordinates of the query area. If the co-ordinates are within the query area then the calculated number of points within the query area (i.e. the "result") is increased/incremented by 1 (S6-4). The processor then determines if any further nodes are scheduled for processing (S6-8). If this is not the case then the traversal ends and the result is returned as the calculated number of points within the query area.

If any nodes are still scheduled for processing, then the processor repeats the process for the next scheduled node that has yet to be processed (i.e. returns to step S6-1).

If the point defined by the co-ordinate data associated with a leaf node is determined not within a query area, the calculated number of points within the query area (i.e. the "result") is not changed, and the processor proceeds to determine if all scheduled nodes have been processed (S6-8).

If the node which is being processed is determined not to be a leaf node, it is then determined whether a bounding box associated with the node being processed intersects with the query area (S6-3).

In the case of the initial root node, this bounding box will correspond to the entire area where incidents might be recorded. For nodes at subsequent level, these bounding boxes are defined recursively by the split values associated with their parent node.

Thus for example, in the case of the area represented by FIG. 2A, the bounding box associated with the root node would correspond to the entire area with corners at points (0,0), (0,9), (9,9) and (9,0). FIG. 2B illustrates bounding boxes associated with the child nodes for which the root node is a parent. That is to say the original bounding box associated with the parent node is divided into two halves based on the split value which in this case is the line at x=4.5. Hence for one of the child node the bounding box will be the box between the points: (0,0), (4.5,0), (4.5, 9) and (0,9) whereas for the other child node the bounding box would be the box between the points (4.5,0), (9,0), (9,9) and (4.5, 9).

The same recursive definition applies at subsequent levels. Thus for example referring to FIG. 2C, the children of the node associated with the bounding box (0,0), (4.5,0), (4.5, 9) and (0,9) are associated with divisions of that box based on the split value y=6 (i.e. the two sub boxes (0,0), (4.5,0), (4.5, 6) and (0,6) and (0,6), (4.5,6), (4.5, 9) and (0,9).

When a bounding box associated with the node currently being processed intersects with the query area being used, it is then determined if the bounding box is entirely contained within the area (S6-5). If this is the case, the calculated number of points within the area (i.e. the "result") is increased by the number of points that are within that bounding box (i.e. that correspond to the node being traversed) (S6-7) and the processor proceeds to determine whether any further nodes remain to be processed (S6-8).

Where a tree structure is stored as in an array as a linearized tree, this provides a straightforward means for determining the exact number of points that are contained within a bounding box associated with any node in the tree. In such a structure the bounding boxes are defined by the split values associated with the nodes of the tree and an associated ordering of the co-ordinate values.

Thus for example in the case of the data representing the distribution of co-ordinates such as is illustrated in FIG. 2A, after processing to determine a set of split values such as is shown in FIG. 4, the co-ordinate data from the co-ordinate records will be ordered such as is shown in FIG. 8.

An integer indexing scheme can then be used to determine the number of incidents present in a particular bounding box. More specifically as each item of co-ordinate data is ordered in a particular manner, it is implicitly associated with an index value identifying where within the ordering the co-ordinate data in question appear as is shown in the index in FIG. 8.

Further, just as each node in the tree is associated with a split value, it is also implicitly associated with a range of leaf nodes which can be reached from that node. Thus for example looking at FIG. 3, the root node which is associated with the split value 4.5 is associated with all of the leaf nodes ranging n FIG. 3 from the leaf node associated with co-ordinates (3,5) to the leaf node associated with co-ordinates (9,5). Conversely, looking further down the tree the node associated with for example the split value 7.5 in the second level of the tree is associated just with a pair of co-ordinates (6,4) and (9,5). In both cases the range of co-ordinates associated with a node is directly determined by the location of the node in the tree.

The number of points or incidents associated with any node can be derived from the index values associated with the co-ordinates associated with a particular node. More specifically, the co-ordinates associated with the highest and lowest index values for leaf nodes which can be reach from a particular node can be determined. The number of incidents which fall within the bounding box associated with that node can then be determined by subtracting the highest index value from the lowest index value and adding one.

Thus for example all the leaf nodes on the tree can be reached from the root node of the tree. Thus the highest and lowest indices associated with co-ordinates in the case of the root node in this example would be 0 and 7 and hence the bounding box associated with the root node can be determined to be 7−0+1=8. Similarly in the case of the node associated with value 7.5 in the second level of the tree which is the parent of the leaf nodes associated with the (6,4) and (9,5), these nodes are associated with the index values 6 and 7 and hence the total number of incidents associated with the bounding box associated with that node is 7−6+1=2.

It will be appreciated in such a system, the identity of the two co-ordinates the index values of which need to be checked is directly derivable from the identity of the node being processed.

Further, it is also possible to determine the numbers of incidents within a bounding box where a filter is applied to the data such as might occur if a user were to implement some selection of a subset of the points (e.g. by selecting a specific area of the displayed image or entering some criteria that must be met by the points). In such a system, the selection of a subset of the points can be represented as a mask such as is shown in FIG. 9 wherein the mask comprises an array containing a Boolean value for each of the points in the linearized tree structure. The mask therefore allocates a Boolean value to each of the points that specifies whether the point has been selected or not. This mask of Boolean values then can also be used to determine a cumulative index value for each of the elements in the array, with the cumulative index value for each element being the cumulative sum of the Boolean values allocated to each preceding element of the array (i.e. those elements to the left of the element). An example of such a cumulative index for an exemplary mask is shown in FIG. 9.

In such a system, the number of selected incidents lying within a bounding box which correspond to selected points can be determined using a similar approach to that described above but using the values in the cumulative index rather than the simple index positions. Thus for example in the case of the mask shown in FIG. 9 and the root node the values extracted would be the values associated with the first and last entries i.e. 0 and 4 and the calculated numbers of incidents would be 4−0=4. In the case of the node associated just with the co-ordinates (6,4) and (9,5) i.e. index values 6 and 7 the number of incidents would be determined to be 4−3=1.

Returning to FIG. 6, when the bounding box associated with the node currently being processed is not entirely contained within the current query area, then the split value associated with the current node being processed is used to split the bounding box two and these two further bounding boxes each of which are associated with the child nodes of the node currently being processed which are scheduled for processing (S6-6). The processor then selects the next scheduled node for processing (i.e. returns to step S6-1).

An exemplification of this process processing the exemplary data of FIG. 2 will now be described with reference to FIG. 7.

FIG. 7 illustrates the space representation of the eight points/co-ordinate records and the subspaces of FIG. 2C, and an example query area of interest (shown by the solid box defined by (0,3), (5,3), (5,9) and (0,9)).

In this example, it can be seen that the bounding box of the root node (i.e. the box (0,0), (0,9), (9,9), (9,0) containing all of the points) and the query area intersects.

Having determined this, the process described above would therefore proceed to consider child nodes of the root node (i.e. the nodes that correspond to the subspaces either side of the splitting plane at x=4.5) by splitting the bounding box enclosing the co-ordinate records into two further bounding boxes and scheduling the a pair of child nodes for processing.

The bounding boxes of the both of these child nodes—the two sub boxes (0,0), (4.5,0), (4.5, 6) and (0,6) and (0,6), (4.5,6), (4.5, 9) and (0,9) (i.e. the division shown in FIG. 2B)—would then be considered. Again it would be determined that the query area intersects with both of these two bounding boxes and the process would therefore proceed to split each of these bounding boxes into two further bounding boxes using the split values associated with the child nodes of the next level in the tree (i.e. by splitting at y=6 and y=3) and schedule the child nodes at the next level of the tree for processing.

At this stage, four bounding boxes for 4 nodes would have to be considered:
(0,0), (4.5,0), (4.5, 6), (0,6)—bottom left
(0,6), (4.5,6), (4.5, 9) (0,9)—top left
(4.5,0), (9,0), (9 3) (4.5,3)—bottom right
(4.5,3, (9,3), (9,9) (4.5,9)—top right
(i.e. the division shown in FIG. 2C).

For the bottom right bounding box (4.5,0), (9,0), (9 3) and (4.5,3) (i.e. corresponding to the subspace below the splitting plane at y=3), it can be seen that this bounding box does not intersect with the query area. When processing the node associated with this bounding box, the process would therefore determine that there are no points within this bounding box that are within the query area and perform no further processing in relation to this bounding box (i.e. no further traversal of the tree below this node would take place).

Conversely, for the top left bounding box (0,6), (4.5,6), (4.5, 9) (0,9) (i.e. corresponding to the subspace above the splitting plane at y=6), it can be seen that this bounding box is entirely contained within the query area. When processing the node associated with this bounding box, the process would therefore determine that all of the points within this bounding box are within the query area. The process would then proceed to determine the index values of the items of co-ordinate data for which the current node is a root node and would subtract the least index value from the greatest value and add one to determine the number of points in the bounding box for the node being processed which in this case would be 2. The running total for incidents in the query area would therefore be incremented by 2 and the process would then perform no further processing of this bounding box (i.e. no further traversal of the tree below this node).

In the case of the other two bounding boxes (i.e. bottom left—(0,0), (4.5,0), (4.5, 6), (0,6) and top right—(4.5,3, (9,3), (9,9) and (4.5,9)) it can be seen that these two bounding boxes intersect with but are not fully contained within the query area.

For the bottom left bounding box (i.e. corresponding to the subspace below the splitting plane at y=6), the process would therefore proceed to traverse the child nodes of this node (i.e. the nodes that correspond to the subspaces either side of the splitting planes x=3.5) by splitting this bounding box into two further bounding boxes at x=3.5—boxes (0,0), (3.5,0), (3.5, 6), (0,6) and (3.5,0), (4.5,0), (4.5, 6), (3.5,6) and scheduling the pair of child nodes to be processed.

Similarly for the top right bounding box, the process would therefore proceed to traverse the child nodes of that node as well (i.e. the nodes that correspond to the subspaces either side of the splitting planes x=7.5) by splitting this bounding box into two further bounding boxes at x=7.5— boxes (4.5,3, (7.5,3), (7.5,9) (4.5,9) and (7.5,3, (9,3), (9,9) (7.5,9) and scheduling the child nodes to be processed.

In this example, processing of each of the nodes associated with the following bounding boxes:

(0,0), (3.5,0), (3.5, 6), (0,6)
(3.5,0), (4.5,0), (4.5, 6), (3.5,6)
(4.5,3, (7.5,3), (7.5,9) and (4.5,9)
(7.5,3, (9,3), (9,9) and (7.5,9)

would therefore be scheduled.

However, all of these bounding boxes correspond to leaf nodes in the tree (i.e., each of the boxes contains a single dot at the position indicated by the co-ordinate data associated with that node.)

Thus when processing the scheduled nodes the process, rather than further traversing the tree, the process would therefore determine if the point associated with the node being processed lies within the original query area.

In the case of processing the node associated with the bounding box (0,0), (3.5,0), (3.5, 6), (0,6), the processor would identify that the co-ordinate (3,5) associated with the node does lie within the query box and the running total would therefore be increased by one which in the case of this example would make the running total of incidents 3.

In the case of the nodes associated with the other bounding boxes: (3.5,0), (4.5,0), (4.5, 6), (3.5,6), (4.5,3, (7.5,3), (7.5,9) and (4.5,9) and (7.5,3, (9,3), (9,9) and (7.5,9), the associated co-ordinates are (4,1), (6,4) and (9,5) and the process would identify that none of these points lies within the original query area.

At this point, the process would determine that no more nodes were scheduled for processing and would return the current running total of incidents as the total number of incidents, which in this example would be 3.

The above described example describes the processing of a system which calculates the total number of incidents associated with a query area. It will be appreciated that in the case of a system determining the numbers of incidents or points corresponding to a subset of the incidents or points such as represented by the mask on FIG. 9, rather than determining whether the co-ordinates associated with a leaf node fall within the scope of a query area, it would first be determined whether the binary mask value associated with a node was set to one or zero. If the mask value was set to zero, no further processing would then take place. Only if the corresponding mask value was set to one would the process then check whether or not the co-ordinate associated with a leaf node was within the query area being processed.

Thus for example in the case of the query area of FIG. 7 when checking the leaf node associated with the co-ordinate (3,5), i.e. processing the query box (0,0), (3.5,0), (3.5, 6), (0,6), the mask would first be checked and having identified that the entry was associated with a 0 in the mask no further processing would be undertaken.

Similarly in the case of determining the number of incidents in a sub-set which are contained within a bounding box, wholly contained within a query area, the number of incidents would be increased by the numbers of incidents in the bounding box which are also in the subset rather than the total number of incidents which lie within the bounding box.

The above described system can be utilized to generate display data for representing the numbers of incidents in particular areas by interrogating the tree structure for a series of query areas corresponding to different portions of a search space. The results returned as a result of the series of queries can then be converted into display data and displayed on a computer screen. Thus in this way the above described system can be utilized to generate a data visualization of the intensity of the numbers of incidents associated with a set of co-ordinate records 7.

Although the embodiments of the invention described with reference to the drawings comprise computer apparatus and processes performed in computer apparatus, the invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A method implemented by a computer for determining for a sub-set of a set of co-ordinate records a number of incidents in the sub-set associated with co-ordinates within a query area, the method comprising:

storing data representing a binary tree comprising leaf nodes, a root node and branch nodes, the root node and branch nodes each being associated with a pair of child nodes, and each being associated with split values, wherein the leaf nodes are associated with individual items of co-ordinate data identified by the set of co-ordinate records together with a binary mask array allocating for each item of co-ordinate data a Boolean value that specifies whether the co-ordinate record stored within that element has been selected as a record within the selected sub-set of records, the storing the co-ordinate data identifying the individual items of the co-ordinate data in an indexed array as an initial group, the root node representing an entire data space, the binary tree used to structure the co-ordinate data being stored in a linearized tree form, generation of the linearized tree form occurring in place where the process takes the array of co-ordinate data and generates a linearized tree by implementing a number of grouping steps within the array that results in an ordered array of co-ordinate data, each of the grouping steps creating another level of a tree, the co-ordinate data being visualized in a form of intensity data, and calculation of the split value and separation of the set of co-ordinates into two groups being based on the split value is an N log N process to make the process suitable for processing a large volume of data;

receiving a query identifying a query area;

selecting the root node as the first node to be processed;

recursively:

determining if the current node being processed corresponds to a leaf node and if so determining whether the item of co-ordinate data associated with the current node is associated with data identifying that the record associated with the leaf node is within the selected sub-set of records and is within the query area and if so incrementing the number of incidents identified as being within the query area by a value corresponding to the number of incidents associated with the leaf node;

if the current node being processed is not a leaf node, determining the extent to which a bounding box associated with the node intersects with the query area wherein the bounding box associated with the root node identifies an area bounding all of the co-ordinates identified by the individual items of co-ordinate data;

if the bounding box associated with the current node being processed is contained entirely within the query area, processing the mask array to generate a cumulative value array of values wherein the nth value in the cumulative value array is the sum of the (n−1) Boolean values in the mask array, and increasing the number of incidents identified as being within the query area by a value corresponding to a determined number of incidents associated with the current node, wherein determining that value corresponding to a determined number of incidents associated with a node currently being processed includes:

identifying co-ordinate records associated with leaf nodes for the portion of the binary tree for which the node being processed is a root node;

determining the least and greatest index values for the identified co-ordinate records; and setting as a value corresponding to a determined number of incidents associated with the current node being processed a value one greater than the difference between the values in the cumulative value array associated with the determined least and greatest index values for the identified co-ordinate records;

if the bounding box associated with the current node partially intersects the query area, scheduling the child nodes of the current node as nodes for processing and associating the child nodes with a bounding box wherein the bounding boxes associated with the child nodes correspond to the bounding box of the current node being processed divided into two parts on the basis of the split value associated with the current node; and outputting the total incremented number of incident values as the number of incidents within the selected sub-set of records associated with co-ordinates within the query area when all scheduled nodes have been processed.

2. The method of claim 1, further comprising receiving user input identifying the subset of the co-ordinate records as the selected sub-set of records.

3. The method of claim 2, wherein determining whether an item of the co-ordinate data associated with the leaf node being processed is associated with data identifying that the record associated with the leaf node is within the selected sub-set of records and is within the query area comprises:

using the Boolean values in the mask array to determine if the co-ordinate record associated with the leaf node is within the selected subset of records and determine whether the item of the co-ordinate data associated with the leaf node is within the query area.

4. The method of claim 1, further comprising ordering the co-ordinate data with the array relative to the split values so that the array of co-ordinate records represents the leaf nodes of the binary tree; and storing the set of the split values and the array of co-ordinate data, which is ordered.

5. The method of claim 4, wherein said ordering the co-ordinate data with the array relative to the split values comprises starts with a group of all items of the co-ordinate data and continues until each said group contains a single item of the co-ordinated data.

6. The method of claim 1, wherein storage of the linearized tree form includes storage of a single dimensional linear array of calculated said split values together with an ordered set of the co-ordinate data.

7. The method of claim 1, wherein the calculation of the split value data and the ordered co-ordinate data includes recursively processing the co-ordinate data to determine the split value for the sub-set of the co-ordinate data.

8. A computer system for determining for a sub-set of a set of co-ordinate records a number of incidents in the sub-set associated with co-ordinates within a query area, comprising:

a data store being operable for storing data representing a binary tree comprising leaf nodes, a root node and branch nodes, wherein the leaf nodes are associated with individual items of co-ordinate data identified by a set of co-ordinate records, and the root node and branch nodes are each associated with a pair of child nodes, and are each associated with split values, wherein the data store is operable to store the data identifying individual items of co-ordinate data in an indexed array together with a mask array identifying for each of the individual items of co-ordinate data whether or not the record associated with that item of co-ordinate data is within the selected sub-set of records, wherein the mask array comprises a binary array allocating for each item of co-ordinate data a Boolean value that specifies whether the co-ordinate record stored within that element has been selected as a record within the selected sub-set of records, the store of the co-ordinate data identifying the individual items of the co-ordinate data in an indexed array as an initial group, the root node representing an entire data space, the binary tree used to structure the co-ordinate data being stored in a linearized tree form, generation of the linearized tree form occurring in place where the process takes the array of co-ordinate data and generates a linearized tree by implementing a number of grouping steps within the array that results in an ordered array of co-ordinate data, each of the grouping steps creating another level of a tree, the co-ordinate data being visualized in a form of intensity data, and calculation of the split value and separation of the set of co-ordinates into two groups being based on the split value is an N log N process to make the process suitable to process a large volume of data; and a processor being operable, in response to receipt of data identifying a query and a selected sub-set of co-ordinate records to:

select the root node as the first node to be processed;

recursively:

determine if the current node being processed corresponds to a leaf node and if so determine whether the item of co-ordinate data associated with the current node is associated with data identifying that the record associated with the leaf node is within the selected sub-set of records and is within the query area and if so increasing the number of incidents identified as being within the area by a value corresponding to the number of incidents associated with the leaf node;

if the current node being processed is not a leaf node, determine the extent to which a bounding box associated with the node intersects with the query area wherein the bounding box associated with the root node identifies an area bounding all of the co-ordinates identified by the individual items of co-ordinate data;

if the bounding box associated with the current node being processed is contained entirely within the query area, increase the number of incidents identified as being within the query area by a value corresponding to a determined number of incidents associated with the current node within the selected sub-set of records, wherein the processor is operable to process a stored mask array to generate a cumulative value array of values wherein the nth value in the array is the sum of the (n−1) Boolean values in the mask array, and determine a value corresponding to a determined number of incidents associated with a node currently being processed by:

identifying co-ordinate records associated with leaf nodes for the portion of the binary tree for which the node being processed is a root node;

determining the least and greatest index values for the identified co-ordinate records; and setting as a value corresponding to a determined number of incidents associated with the current node being processed a value one greater than the difference between the values in the cumulative value array associated with the determined least and greatest index values for the identified co-ordinate records;

if the bounding box associated with the current node partially intersects the query area, schedule the child nodes of the current node as nodes for processing and associate the child nodes with a bounding box wherein the bounding boxes associated with the child nodes correspond to the bounding box of the current node being processed divided into two parts on the basis of the split value associated with the current node; and outputting the total incremented number of incident values as the number of incidents within the selected sub-set of records associated with co-ordinates within the query area when all scheduled nodes have been processed, wherein the processor generates the linearized tree form and calculates the split value.

9. The system of claim 8, wherein the processor is operable to determine whether the item of the co-ordinate data associated with a leaf node being processed is associated with data identifying that the record associated with the leaf node is within the selected sub-set of records and is within the query area using the Boolean values in the mask array to determine if the co-ordinate record associated with a leaf node is within the selected subset of records.

10. The system of claim wherein 8, wherein the data store is arranged to store a set of co-ordinate records each of which identifies a point using a pair of co-ordinates indicative of a location of an incident.

11. The system of claim 10, wherein the processor is arranged to retrieve data from the data store and generate a graphic representation of densities of incidents based on the co-ordinate data of the points.

12. The system of claim 8, wherein the binary tree includes a structure constructed where splitting planes are axis-oriented with respective orientation cycling with each level of recursion.

13. The system of claim 12, wherein each of a splitting location is chosen at a median of points sorted along the splitting planes in order to produce said binary tree with a balanced structure where each subspace includes about a same number of the points.

14. The system of claim 8, wherein the co-ordinate data is stored separately within the index array and the split values stored in a separate, second further array, and wherein an order of the co-ordinate data within the index array and the split values in the separate, second further array defines the structure of the binary tree.

15. The system of claim 12, wherein each of the branch nodes includes the splitting axis of the splitting plane, which is chosen, and the split value along a respective axis.

16. The system of claim 8, wherein the processor utilizes the stored data in a manner to traverse, recursively, branches of an implicit tree structure recorded by the data from the root node to determine a number of incidents within a particular area.

17. The system of claim 16, wherein the implicit tree structure is limited to process higher levels of the tree when it is determined that a node lies one of wholly in and outside of a query area.

18. A non-transitory computer readable medium storing computer implementable instructions, which when implemented by a programmable computer, which includes a processor and a data store, to cause the computer to perform the following operations:

storing data representing a binary tree comprising leaf nodes, a root node and branch nodes, the root node and branch nodes each being associated with a pair of child nodes, and each being associated with split values, wherein the leaf nodes are associated with individual items of co-ordinate data identified by the set of co-ordinate records together with a binary mask array allocating for each item of co-ordinate data a Boolean value that specifies whether the co-ordinate record stored within that element has been selected as a record within the selected sub-set of records, the storing the co-ordinate data identifying the individual items of the co-ordinate data in an indexed array as an initial group, the root node representing an entire data space, the binary tree used to structure the co-ordinate data being stored in a linearized tree form, generation of the linearized tree form occurring in place where the process takes the array of co-ordinate data and generates a linearized tree by implementing a number of grouping steps within the array that results in an ordered array of co-ordinate data, each of the grouping steps creating another level of a tree, the co-ordinate data being visualized in a form of intensity data, and calculation of the split value and separation of the set of co-ordinates into two groups being based on the split value is an N log N process to make the process suitable for processing a large volume of data;

receive a query identifying a query area;

select the root node as the first node to be processed;

recursively:

determining if the current node being processed corresponds to a leaf node and if so determining whether the item of co-ordinate data associated with the current node is associated with data identifying that the record associated with the leaf node is within the selected sub-set of records and is within the query area and if so incrementing the number of incidents identified as being within the query area by a value corresponding to the number of incidents associated with the leaf node;

if the current node being processed is not a leaf node, determine the extent to which a bounding box associated with the node intersects with the query area wherein the bounding box associated with the root node identifies an area bounding all of the co-ordinates identified by the individual items of co-ordinate data;

if the bounding box associated with the current node being processed is contained entirely within the query area, process the mask array to generate a cumulative value array of values wherein the nth value in the cumulative value array is the sum of the (n−1) Boolean values in the mask array, and increase the number of incidents identified as being within the query area by a value corresponding to a determined number of incidents associated with the current node, wherein determining that value corresponding to a determined number of incidents associated with a node currently being processed comprises:
  identifying co-ordinate records associated with leaf nodes for the portion of the binary tree for which the node being processed is a root node;
  determining the least and greatest index values for the identified co-ordinate records; and
  setting as a value corresponding to a determined number of incidents associated with the current node being processed a value one greater than the difference between the values in the cumulative value array associated with the determined least and greatest index values for the identified co-ordinate records;

if the bounding box associated with the current node partially intersects the query area, scheduling the child nodes of the current node as nodes for processing and associating the child nodes with a bounding box wherein the bounding boxes associated with the child nodes correspond to the bounding box of the current node being processed is divided into two parts on the basis of the split value associated with the current node; and outputting the total incremented number of incident values as the number of incidents within the selected sub-set of records associated with co-ordinates within the query area when all scheduled nodes have been processed.

19. The non-transitory computer readable medium storing computer implementable instructions of claim 18, wherein the binary mask includes the binary mask array, which includes the Boolean value for each of points in the linearized tree structure.

20. The non-transitory computer readable medium storing computer implementable instructions of claim 18, wherein when the bounding box associated with the current node is not entirely contained within the current query area then the split value associated with the current node processed splits a bounding box two.

21. The non-transitory computer readable medium storing computer implementable instructions of claim 18, wherein the process with the bounding box determines there are no points within the bounding box within the query area and performs no additional processing in relation to the bounding box.

22. The non-transitory computer readable medium storing computer implementable instructions of claim 18, wherein when the process with the bounding box determines all of the points within this bounding box are within the query area, then the process determines the index values of the items of the co-ordinate data for which the current node is the root node.

23. The non-transitory computer readable medium storing computer implementable instructions of claim 18, wherein when the binary mask value associated with the current node is set to zero, then no further processing occurs when the mask value is set to zero.

24. The non-transitory computer readable medium storing computer implementable instructions of claim 18, further comprising generating display data by representing a number of incidents in particular areas by interrogating a tree structure for a series of query areas corresponding to different portions of a search space.

25. The non-transitory computer readable medium storing computer implementable instructions of claim 18, further comprising determining a number of incidents in a sub-set in the bounding box being contained within the query area, wherein the number of the incidents are increased by the number of incidents in the bounding box, which are also in a subset rather than a total number incidents within the bounding box.

26. The non-transitory computer readable medium storing computer implementable instructions of claim 18, wherein the implementable instructions are situated in one of on and in a carrier capable of carrying the implementable instructions.

27. The non-transitory computer readable medium storing computer implementable instructions of claim 26, wherein the carrier includes a storage medium, which includes a CD ROM, a semiconductor ROM, and magnetic recording medium.

* * * * *